US009821272B2

(12) United States Patent
Schraml et al.

(10) Patent No.: US 9,821,272 B2
(45) Date of Patent: Nov. 21, 2017

(54) DEVICE AND METHOD FOR THE PURIFICATION OF DIESEL ENGINE EXHAUST GASES (71) Applicant: Deutz Aktiengesellschaft, Cologne (DE)

(72) Inventors: Stephan Schraml, Koenigswinter (DE); Meike Wittrock, Bergisch-Gladbach (DE); Markus Mueller, Bergisch-Gladbach (DE)

(73) Assignee: Deutz Aktiengesellschaft, Cologne (DE)

( * ) Notice: Subject to any disclaimer, the term of this patent is extended or adjusted under 35 U.S.C. 154(b) by 463 days.

(21) Appl. No.: 14/359,753

(22) PCT Filed: Nov. 16, 2012

(86) PCT No.: PCT/EP2012/004765
§ 371 (c)(1),
(2) Date: Jun. 11, 2015

(87) PCT Pub. No.: WO2013/075803
PCT Pub. Date: May 30, 2013

(65) Prior Publication Data
US 2015/0283507 A1    Oct. 8, 2015

(30) Foreign Application Priority Data

Nov. 22, 2011  (EP) ..................... 11009222

(51) Int. Cl.
*B01D 53/94* (2006.01)
*F01N 3/035* (2006.01)
*F01N 3/20* (2006.01)
*F01N 13/02* (2010.01)
*F01N 13/00* (2010.01)

(52) U.S. Cl.
CPC ..... *B01D 53/9477* (2013.01); *B01D 53/9495* (2013.01); *F01N 3/035* (2013.01); *F01N 3/2066* (2013.01); *F01N 13/0093* (2014.06); *F01N 13/02* (2013.01); *F01N 2250/02* (2013.01); *F01N 2560/026* (2013.01); *F01N 2610/02* (2013.01); *F01N 2610/1453* (2013.01); *Y02T 10/24* (2013.01)

(58) Field of Classification Search
CPC .............. B01D 53/927; B01D 53/9418; B01D 53/9422; B01D 53/944; B01D 53/9477; F01N 3/035; F01N 3/103; F01N 3/2066
See application file for complete search history.

(56) References Cited

U.S. PATENT DOCUMENTS

| | | | | |
|---|---|---|---|---|
| 5,491,120 A * | 2/1996 | Voss | ..................... | B01D 53/864 423/215.5 |
| 8,151,558 B2 * | 4/2012 | Robel | ..................... | F02M 26/15 60/278 |
| 8,409,515 B2 * | 4/2013 | Ren | ..................... | F01N 13/009 422/171 |
| 8,544,260 B2 * | 10/2013 | Boorse | ..................... | F01N 3/035 60/273 |
| 8,887,495 B2 * | 11/2014 | Ren | ..................... | B01D 46/0024 60/274 |
| 8,997,465 B2 * | 4/2015 | Gekas | ..................... | F01N 13/0093 60/274 |
| 9,132,386 B2 * | 9/2015 | Udd | ..................... | F01N 3/106 |
| 2009/0035195 A1 * | 2/2009 | Robel | ..................... | F01N 3/0231 422/177 |
| 2009/0193794 A1 | 8/2009 | Robel et al. | | |
| 2010/0221161 A1 * | 9/2010 | Schneider | ..................... | B01D 53/9477 423/213.5 |
| 2013/0232958 A1 * | 9/2013 | Ancimer | ..................... | F01N 3/035 60/301 |
| 2014/0363358 A1 * | 12/2014 | Udd | ..................... | F01N 3/106 423/212 |
| 2015/0020506 A1 * | 1/2015 | Johansen | ..................... | B01D 53/90 60/274 |
| 2015/0086426 A1 * | 3/2015 | DeGeorge | ..................... | F01N 11/007 422/108 |
| 2015/0337702 A1 * | 11/2015 | Ettireddy | ..................... | F02B 37/00 60/297 |
| 2017/0051654 A1 * | 2/2017 | Gupta | ..................... | F01N 3/035 |
| 2017/0087515 A1 * | 3/2017 | Huang | ..................... | B01D 53/9477 |

FOREIGN PATENT DOCUMENTS

| | | |
|---|---|---|
| DE | 102008019814 | 10/2009 |
| DE | 112009000229 | 12/2010 |
| EP | 0341832 | 11/1989 |
| EP | 1054722 | 11/2000 |
| EP | 2123345 | 11/2009 |
| WO | WO9939809 | 8/1999 |
| WO | WO03054364 | 7/2003 |
| WO | WO2007145548 | 12/2007 |
| WO | WO2009017597 | 2/2009 |

* cited by examiner

Primary Examiner — Timothy Vanoy
(74) Attorney, Agent, or Firm — Davidson, Davidson & Kappel, LLC (57) ABSTRACT A device and a method for reducing carbon monoxide, hydrocarbons, nitrogen oxides and soot particles present in the exhaust gases of diesel engines are provided. The device includes 1) a diesel oxidation catalyst for the oxidation of carbon monoxide, hydrocarbons and nitrogen monoxide; 2) a first unit by means of which ammonia and/or a compound that breaks down to form ammonia can be metered into the exhaust gas that is to be purified; 3) a catalytically activated particulate filter, containing a wall-flow filter substrate comprising a catalytically active material that promotes the selective catalytic reduction of nitrogen oxides to form nitrogen; 4) a second unit by means of which ammonia and/or a compound that breaks down to form ammonia can be metered into the exhaust gas that is to be purified; as well as 5) a catalyst for the selective catalytic reduction of nitrogen oxides to form nitrogen.

16 Claims, 4 Drawing Sheets

Figure 1

Figure 2 ced catalyst that is effective in converting at least part
DEVICE AND METHOD FOR THE PURIFICATION OF DIESEL ENGINE EXHAUST GASES The invention relates to a device and to a method for reducing carbon monoxide, hydrocarbons, nitrogen oxides and soot particles present in the exhaust gas of diesel engines, in particular, the invention relates to a device and to a corresponding method that makes use of a catalytically activated particulate filter comprising a catalytically active material that promotes the selective catalytic reduction of nitrogen oxides to form nitrogen.

BACKGROUND

The exhaust gas of diesel motors contains not only carbon monoxide (CO), but also hydrocarbons (HC), nitrogen oxides ($NO_x$) and soot particles (PM) with up to 10% by volume of oxygen. Conventional diesel oxidation catalysts that effectively promote the reaction of carbon monoxide and hydrocarbons with the oxygen contained in the exhaust gas to form harmless carbon dioxide ($CO_2$) are well-suited to reduce the amount of carbon monoxide and hydrocarbons. Lowering the amount of nitrogen oxides contained in the exhaust gas through the reduction thereof to form nitrogen is more difficult since this calls for the presence of a sufficient quantity of a suitable reducing agent. Various methods are known from the state of the art in order to achieve this objective such as, for example, the use of so-called HC-$DeNO_x$ catalysts that promote the conversion of the nitrogen oxides contained in the exhaust gas—along with the hydrocarbons likewise contained in the exhaust gas—to form nitrogen, or else the use of so-called nitrogen oxide storage catalysts. The method for reducing nitrogen oxides in diesel engine exhaust gases currently used most often is so-called selective catalytic reduction (SCR). In this method, ammonia and/or a compound that breaks down to form ammonia such as, for example, urea or ammonium carbamate is added to the exhaust gas that is to be purified as the reducing agent from a source that is independent of the engine. On a catalyst that is suitable for this purpose, the so-called SCR catalyst the nitrogen oxides contained in the exhaust gas are reacted with ammonia to form harmless nitrogen in a comproportionation reaction.

Soot particles are formed during the combustion process inside the engine under conditions at which the combustion of the diesel fuel is not complete. These particles typically consist of soot to which long-chain hydrocarbons can adhere (Soluble Organic Fraction—SOF). Moreover, depending on the diesel fuel used, a so-called inorganic-soluble fraction, for example, sulfuric acid fractions formed from water vapor and sulfur oxides stemming from the combustion of sulfurous diesel fuel constituents in the combustion chamber of the cylinder can adhere to the soot. Diesel particulate filters are typically used to remove soot particles from the exhaust gas of diesel engines. These are preferably so-called "closed" filters that contain a wall-flow filter substrate through which the exhaust gas that is to be purified is fed. Such wall-flow filter substrates, shown for example in FIG. 1 by a wall-flow filter (1) of a length L, have inflow channels (4) through which the exhaust gas that is to be purified and that contains soot particles flows into the filter, and which are closed (7) on the outlet side (3) of the filter so as to be gas-tight. The exhaust gas, which flows in direction-→reaches the so-called outflow channels (6) through a porous wall (5). The outflow channels are closed (7) on the inlet side (2) so as to be gas-tight. The porous wall between the inflow and outflow channels is configured in such a way that only the gaseous fractions of the exhaust gas pass through the pores in the wall, whereas the soot particles (8) are held back in the inflow channels of the filter. In order to prevent clogging of the filter, the soot particles held back in the filter are reacted at suitable exhaust gas temperatures with oxidizing constituents of the exhaust gas (nitrogen dioxide and/or oxygen) at least proportionally to form gaseous carbon monoxide and/or carbon dioxide.

Compliance with current and future emission legislation requires a marked reduction of all noxious gases (CO, HS, $NO_x$) contained in diesel engine exhaust gas as well as a marked reduction of the soot particles contained in the exhaust gas. Methods for exhaust gas purification which constitute solutions to this problem are already known from the state of the art.

Thus, for instance, European patent EP-B 1 054 722 discloses a system for the selective catalytic reduction (SCR) system for the treatment of combustion exhaust gas containing $NO_x$ and solid particulates, comprising the following in combination and in the order indicated below: an oxidation catalyst that is effective in converting at least part of the NO of the $NO_x$ into $NO_2$ and in increasing the $NO_2$ content in the exhaust gas; a fine particulate filter; a reservoir for a reducing fluid; injection devices for such a reducing fluid that are located downstream from the fine particulate filter; and an SCR catalyst. European patent EP-B 2 123 345 discloses such an arrangement of the following exhaust gas purification aggregates: diesel oxidation catalyst, diesel particulate filter, and SCR catalyst, whereby, however, a catalytically activated diesel particulate filter is used, and whereby a specific distribution of the oxidatively active noble metal components platinum and palladium over the diesel oxidation catalyst and the diesel particulate filter is disclosed that is supposed to result in an improvement in the efficiency of the overall system described in European patent EP-B 1 054 722. Both systems are fundamentally suitable to effectively reduce carbon monoxide, hydrocarbons, nitrogen oxides and soot particles that are present in the exhaust gas of diesel engines. However, both systems have the drawback that, in order to achieve the purification efficiency required with an eye towards upcoming emission legislation, particularly in the case of large diesel engines, very large exhaust gas purification aggregates have to be used for which a great deal of installation space has to be provided. This is especially the case with an eye towards achieving the requisite purification efficiency for nitrogen oxides that have to be converted on the SCR catalyst located on the outflow side.

Particularly in the sector of construction and agricultural machinery, there is very little installation space available for exhaust gas purification aggregates.

SUMMARY OF THE INVENTION

It is an object of the present invention to provide a device and a method for the purification of diesel engine exhaust gases that, in comparison to the methods described in the state of the art, have a considerably improved purification efficiency, especially when it comes to reducing nitrogen oxides, thereby permitting significant savings in terms of installation space.

The present invention provides a device for reducing carbon monoxide, hydrocarbons, nitrogen oxides and soot particles present in the exhaust gases of diesel engines, comprising an exhaust gas line and, as components thereof, the following in combination and in the flow direction of the exhaust gas in the order indicated below:

1. a diesel oxidation catalyst for the oxidation of carbon monoxide, hydrocarbons and nitrogen monoxide;
2. a first unit by means of which ammonia and/or a compound that breaks down to form ammonia can be metered into the exhaust gas that is to be purified;
3. a catalytically activated particulate filter, containing a wall-flow filter substrate comprising a catalytically active material that promotes the selective catalytic reduction of nitrogen oxides to form nitrogen;
4. a second unit by means of which ammonia and/or a compound that breaks down to form ammonia can be metered into the exhaust gas that is to be purified; as well as
5. a catalyst for the selective catalytic reduction of nitrogen oxides to form nitrogen.

The present invention also provides by a method for reducing carbon monoxide, hydrocarbons, nitrogen oxides and soot particles present in the exhaust gases of diesel engines, comprising the following:
1. the diesel engine exhaust gas that is to be purified is passed through a diesel oxidation catalyst, whereby carbon monoxide and hydrocarbons are oxidized at least proportionally to form carbon dioxide, and nitrogen monoxide is oxidized at least proportionally to form nitrogen dioxide;
2. a first addition of ammonia and/or of a compound that breaks down to form ammonia to the exhaust gas that is to be purified, on the outflow side relative to the diesel oxidation catalyst;
3. after the first addition of ammonia and/or of a compound that breaks down to form ammonia, the exhaust gas that is to be purified is passed through a catalytically activated particulate filter, whereby the soot particles are deposited in the particulate filter and oxidized at least proportionally with the nitrogen dioxide contained in the exhaust gas so as to form carbon monoxide and/or carbon dioxide, and whereby the nitrogen oxides that are contained in the exhaust gas that is to be purified and/or that are formed as by-products during the soot oxidation are reduced at least proportionally with ammonia to form nitrogen;
4. a second addition of ammonia and/or of a compound that breaks down to form ammonia to the exhaust gas that is to be purified, on the outflow side relative to the particulate filter; as well as
5. after the second addition of ammonia and/or of a compound that breaks down to form ammonia, the exhaust gas that is to be purified is passed through a catalyst for the selective catalytic reduction of nitrogen oxides (SCR catalyst), whereby nitrogen monoxide and nitrogen dioxide are reduced at least proportionally with ammonia to form nitrogen.

A device is also provided for reducing carbon monoxide, hydrocarbons, nitrogen oxides and soot particles present in the exhaust gas of diesel engines, comprising an exhaust gas line and, as components thereof, the following in combination and in the flow direction of the exhaust gas in the order indicated below:
1. a first unit by means of which ammonia and/or a compound that breaks down to form ammonia can be metered into the exhaust gas that is to be purified;
2. a catalytically activated particulate filter, containing a wall-flow filter substrate comprising a catalytically active material that promotes the selective catalytic reduction of nitrogen oxides to form nitrogen, as well as at least one catalytically active coating that promotes the oxidation of carbon monoxide and hydrocarbons to form carbon dioxide, as well as the oxidation of nitrogen monoxide to form nitrogen dioxide;
3. a second unit by means of which ammonia and/or a compound that breaks down to form ammonia can be metered into the exhaust gas that is to be purified; as well as
4. a catalyst for the selective catalytic reduction of nitrogen oxides to form nitrogen.

DETAILED DESCRIPTION

Figure 2:
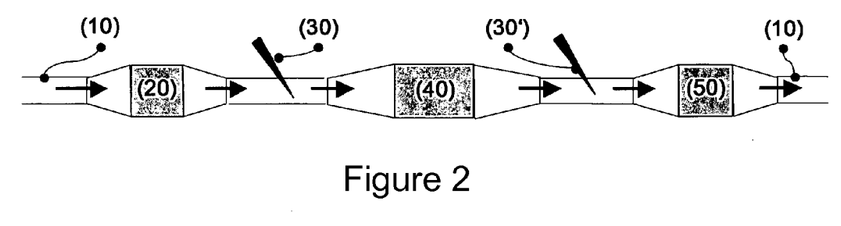
FIG. 2 shows a schematic depiction of a device according to an embodiment of the present invention.

FIG. 2 shows device for reducing carbon monoxide, hydrocarbons, nitrogen oxides and soot particles present in the exhaust gases of diesel engines comprising an exhaust gas line 10 and, as components thereof, the following in combination and in the flow direction of the exhaust gas in the order indicated below:
1. a diesel oxidation catalyst 20 for the oxidation of carbon monoxide, hydrocarbons and nitrogen monoxide;
2. a first unit 30 by means of which ammonia and/or a compound that breaks down to form ammonia can be metered into the exhaust gas that is to be purified;
3. a catalytically activated particulate filter 40, containing a wall-flow filter substrate comprising a catalytically active material that promotes the selective catalytic reduction of nitrogen oxides to form nitrogen;
4. a second unit 30' by means of which ammonia and/or a compound that breaks down to form ammonia can be metered into the exhaust gas that is to be purified; as well as
5. a catalyst for the selective catalytic reduction of nitrogen oxides to form nitrogen (SCR catalyst, 50).

A catalytically activated particulate filter comprising a catalytically active material that promotes the selective catalytic reduction of nitrogen oxides to form nitrogen is used in combination with two units for metering in ammonia and/or a compound that breaks down to form ammonia as the reducing agent, whereby one unit is installed on the inflow side relative to the catalytically activated particulate filter, while the second such unit is installed on the outflow side relative to the particulate filter and on the inflow side relative to the downstream SCR catalyst, and this makes it possible to improve the purification efficiency of the system vis-à-vis nitrogen oxides in such a way as to allow a marked decrease in volume of the downstream SCR catalyst and thus considerable savings in terms of installation space. Another advantage of the system according to embodiments of the invention is that a suitable selection of the SCR catalytically active material in the catalytically activated particulate filter, on the one hand, and in the downstream SCR catalyst, on the other hand, can ensure an improved harmonization of the high-temperature and low-temperature efficiency of the SCR catalytically active purification aggregates with the actual exhaust gas temperature level as well as an improved protection against poisoning of said purification aggregates, for example, by sulfur oxides and/or hydrocarbons.

Moreover, the system according to embodiments of the invention has substantially higher nitrogen oxide conversion rates to form nitrogen as compared to systems according to the state of the art. These high $NO_x$ conversion rates make it possible to comply with current and future emission limit values without having to provide devices for exhaust gas recirculation. This accounts for considerable savings in terms of material costs on the one hand and development and application work on the other hand.

Various embodiments of the device according to the invention and of the method according to the invention are described in detail below.

According to the present invention, the diesel engine exhaust gas that is to be purified is fed through a diesel oxidation catalyst, whereby carbon monoxide and hydrocarbons are oxidized proportionally to form carbon dioxide. Moreover, nitrogen monoxide contained in the exhaust gas is oxidized at least proportionally to form nitrogen dioxide. Suitable diesel oxidation catalysts include conventional catalysts known from the state of the art which typically contain one or more noble metals selected from among the group consisting of platinum, palladium, rhodium and mixtures thereof. Moreover, the diesel oxidation catalyst can contain not only the usual coating components such as aluminum oxide, silicon dioxide, cerium oxide, zirconium oxide and/or mixtures thereof, but also alumosilicates and/or zeolites and/or zeolite-like compounds that have the property of storing hydrocarbons at exhaust gas temperatures below 250° C. [482° F.] and of once again desorbing them at higher temperatures and of reacting them with oxygen and/or nitrogen dioxide contained in the exhaust gas at least proportionally to form carbon dioxide.

After a first addition of ammonia and/or of a compound that breaks down to form ammonia to the exhaust gas that is to be purified, after this exhaust gas has been passed through the catalytically activated particulate filter and after a second addition of ammonia and/or of a compound that breaks down to form ammonia, the exhaust gas that is to be purified is fed through a catalyst for the selective catalytic reduction of nitrogen oxides (SCR catalyst), whereby nitrogen monoxide and nitrogen dioxide are reacted at least proportionally with ammonia in a comproportionation reaction to form nitrogen. Suitable SCR catalysts likewise include conventional catalysts that are well known from the state of the art and that can comprise one or more of the following active components:

transition metal oxides selected from among the group consisting of vanadium oxide, tungsten oxide, titanium oxide, cerium oxide, zirconium oxide, lanthanum oxide, praseodymium oxide, neodymium oxide, niobium oxide, molybdenum oxide, iron oxide and/or mixtures and mixed oxides thereof;

zeolites substituted with one or more transition metals and/or zeolite-like compounds, whereby the transition metals are selected from among the group consisting of iron, copper, platinum, iridium, silver, cerium and/or mixtures thereof; and whereby the zeolites and/or the zeolite-like compounds are selected from among the group consisting of ZSM-5, ZSM-20, USY, β-zeolite, FER, MOR, CHA, SAPO, ALPO and/or mixtures thereof.

The device according to embodiments of the invention also comprises two units by means of which ammonia and/or a compound that breaks down to form ammonia can be metered into the exhaust gas that is to be purified, whereby a first unit is arranged between the diesel oxidation catalyst and the catalytically activated particulate filter, and a second unit is arranged between the catalytically activated particulate filter and the SCR catalyst. Both units permit ammonia and/or a compound that breaks down to form ammonia to be metered in as the reducing agent for nitrogen oxides from a source that is independent of the engine. This type of equipment as such is likewise known in the state of the art from the structuring of conventional SCR systems and it can be used in the device according to embodiments of the invention in order to carry out the method according to embodiments of the invention.

Figure 1:
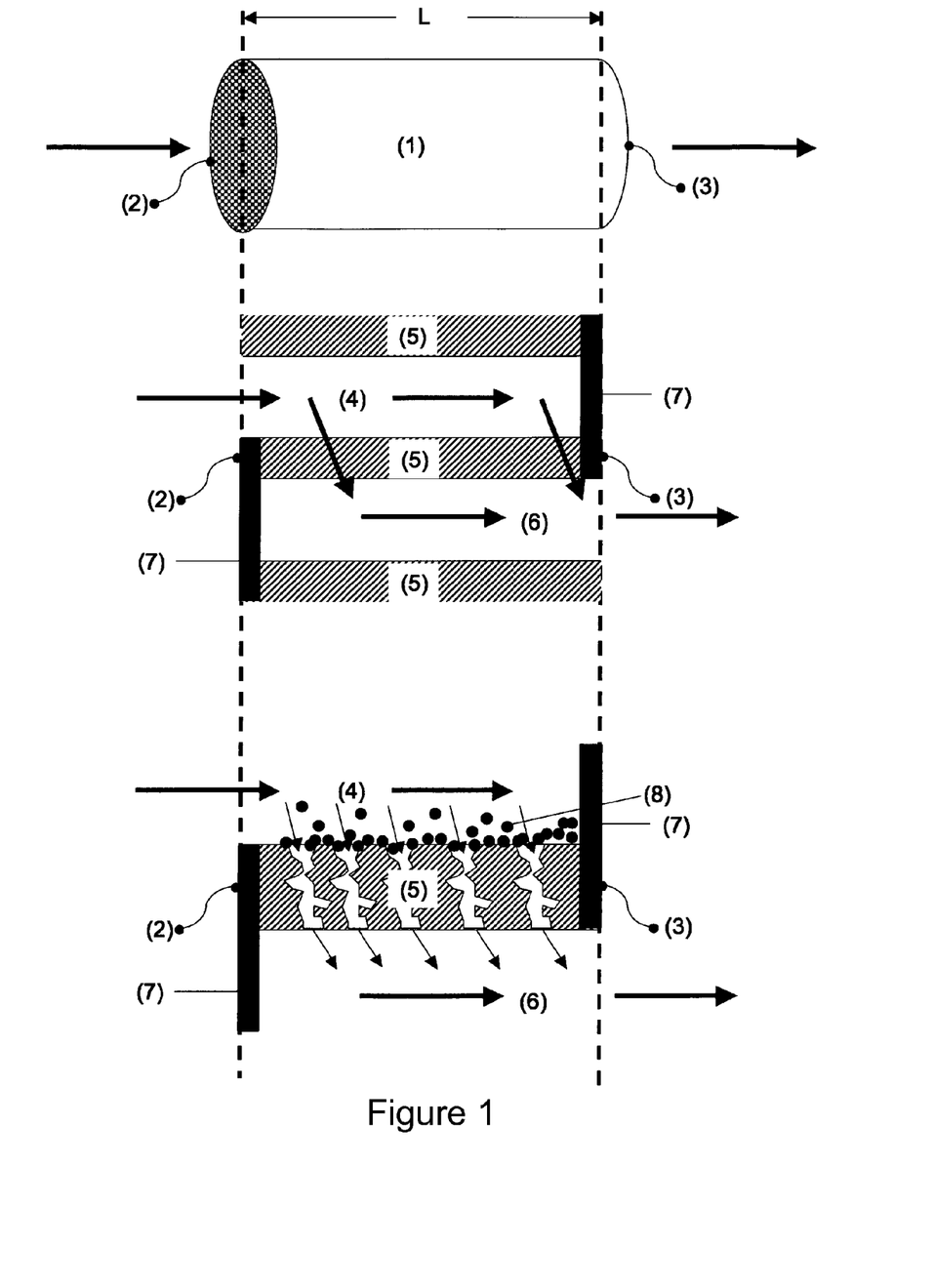
FIG. 1 shows a schematic depiction of a known wall-flow filter substrate.

The catalytically activated particulate filter used in the device according to embodiments of the invention and in the method according to the invention contains a wall-flow filter substrate, comprising a catalytically active material that promotes the selective catalytic reduction of nitrogen oxides to form nitrogen. As schematically shown in FIG. 1 and as was already explained in depth above, a wall-flow filter substrate has inflow and outflow channels that are alternately closed so as to be gas-tight and that are separated from each other by a porous wall that is permeable for the exhaust gas that is to be purified.

Within the scope of the present invention, the wall-flow filter substrate itself can already be made of a catalytically active material that promotes the selective catalytic reduction of nitrogen oxides to form nitrogen. For example, such substrates can be made in a fully extruded form from transition metal oxides selected from among the group consisting of vanadium oxide, tungsten oxide, titanium oxide, cerium oxide, zirconium oxide, lanthanum oxide, praseodymium oxide, neodymium oxide, niobium oxide, molybdenum oxide, iron oxide and/or mixtures and mixed oxides thereof.

In the preferred embodiments of this invention, the catalytically active material contained in the catalytically activated particulate filter is present as a catalytically active coating that promotes the selective catalytic reduction of nitrogen oxides to form nitrogen (SCR coating 150). Especially preferably, as shown schematically in FIG. 3A, such a catalytically active coating 150 is applied in the porous wall 5 that physically separates the inflow channels 4 and outflow channels 6 from each other and that belongs to an otherwise catalytically inert wall-flow filter substrate 1, so that this porous wall 5 also encompasses the appertaining SCR coating 150.

Figure 3A:
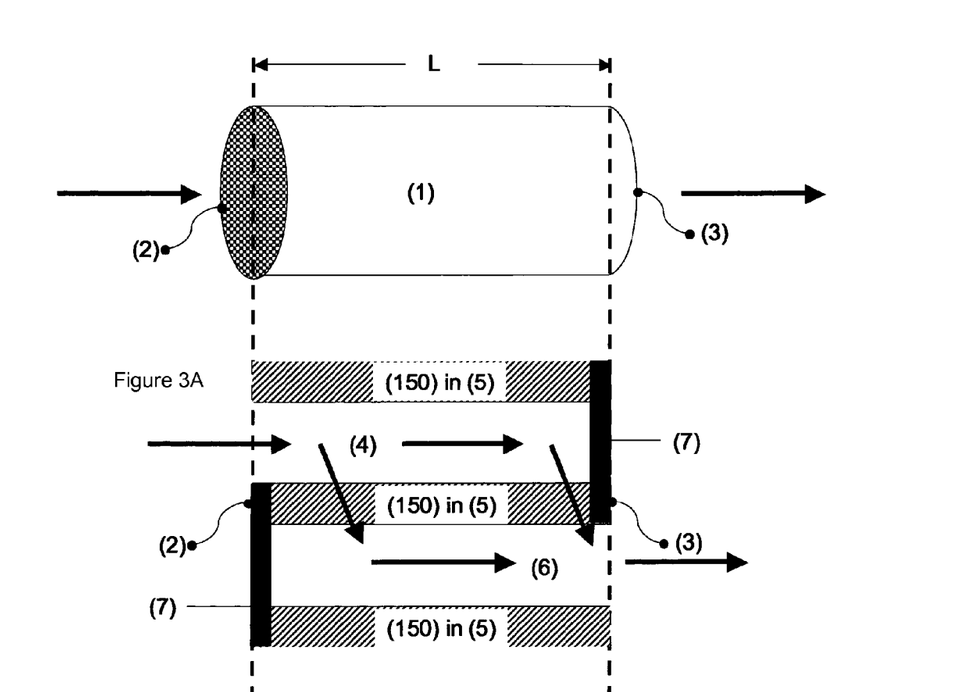
FIGS. 3A, 3B, 3C and 3D show several embodiments of the catalytically activated particulate filter employed in a device according to embodiments of the invention and in a method according to embodiments of the invention.

The exhaust gas that enters the catalytically activated particulate filter contains not only traces of carbon monoxide and hydrocarbons that might be present due to an incomplete conversion in the upstream diesel oxidation catalyst, but also particularly soot particles as well as nitrogen monoxide and nitrogen dioxide and ammonia. As the exhaust gas passes through the wall, the soot particles are held back in the inflow channels. There—depending on the exhaust gas temperature—they are oxidized at least proportionally with the nitrogen dioxide likewise present in the exhaust gas under the formation of nitrogen monoxide to form gaseous carbon monoxide and/or carbon dioxide (so-called "CRT reaction" according to the method described in European patent EP-B 0 341 832). Nitrogen monoxide and nitrogen dioxide that was not converted during the oxidation of the soot particles are reacted with ammonia at least proportionally when they pass through the wall on the SCR catalytically active material or on the SCR catalytically active coating to form nitrogen.

It is known that the SCR reaction with ammonia can take place as a function of the ratio of nitrogen monoxide to nitrogen dioxide present in the exhaust gas according to three different reaction mechanisms, namely:

$$NO+NO_2+2NH_3 \rightarrow 2N_2+3H_2O \tag{1}$$

$$2NO+2NH_3+\tfrac{1}{2}O_2 \rightarrow 2N_2+3H_2O \tag{2}$$

$$6NO_2+8NH_3 \rightarrow 7N_2+12H_2O \tag{3}$$

Of these reactions, Reaction (1) is the fastest and Reaction (3) is the slowest. The SCR reaction is especially promoted when the mole ratio of nitrogen monoxide to nitrogen dioxide in the exhaust gas is approximately 1:1.

Since nitrogen dioxide is also consumed by the CRT reaction, competition occurs in the catalytically activated particulate filter between an effective soot particle oxidation on the one hand, and the selective catalytic reduction of the nitrogen oxides to form nitrogen on the other hand. Under operating conditions at which the CRT reaction takes place particularly effectively, only very little nitrogen dioxide still passes through the wall that is situated between the inflow and outflow channels and that comprises the SCR catalytically active material or the SCR catalytically active coating, so that it is primarily Reaction (2) that takes place there. This can result in a lowering of the DeNOx efficiency. Therefore, in order to complete the $NO_x$ conversion of the overall system, a second unit for metering in ammonia and/or a compound that breaks down to form ammonia has to be provided downstream from the catalytically activated particulate filter as well as an SCR catalyst where the remaining nitrogen oxides can react with ammonia to form nitrogen. Here, however, a much smaller SCR catalyst volume can be selected as compared to systems according to the state of the art, since most of the reduction of the nitrogen oxides to form nitrogen has already taken place in the upstream catalytically activated particulate filter.

Figure 3B:
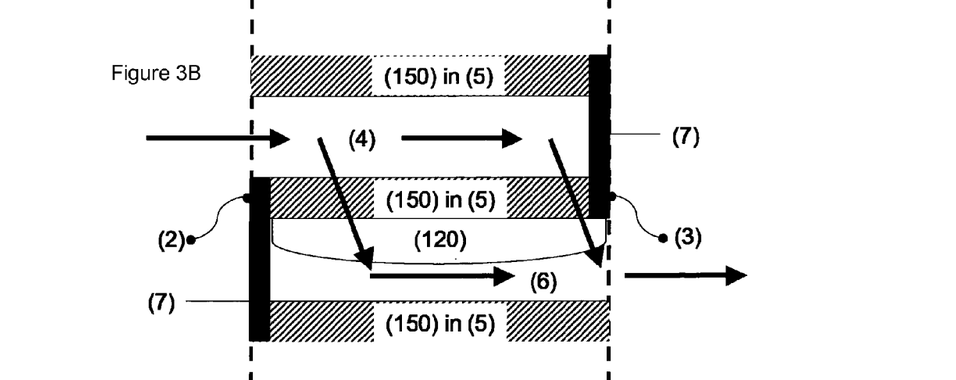

In particularly preferred embodiments of the device according to the invention, a further increase in the DeNOx efficiency can be achieved in that the catalytically activated particulate filter also contains at least one catalytically active coating 120 that promotes the oxidation of carbon monoxide and hydrocarbons to form carbon dioxide, as well as the oxidation of nitrogen monoxide to form nitrogen dioxide. In particular, such an oxidation-catalytic coating 120 can be applied to the wall in the outflow channels, as is schematically shown in FIG. 3B. This oxidation-catalytic coating 120 can be applied over the entire length L of the wall-flow filter substrate 1 or else as a zone on the outflow side 3. The mole ratio of nitrogen monoxide to nitrogen dioxide on this oxidation-catalytic coating 120 can be once again adjusted to a value near 1:1 through the at least partial oxidation of the nitrogen monoxide passing through the wall. As a result, the DeNOx efficiency of the downstream SCR catalyst 150 is further enhanced, thus permitting additional volume savings for the downstream SCR catalyst 150. Furthermore, due to the oxidation-catalytic active coating 120 arranged in the outflow channels 6, secondary emissions of carbon monoxide resulting from the CRT reaction can be reacted with oxygen present in the exhaust gas to form harmless carbon dioxide.

Figure 3C:
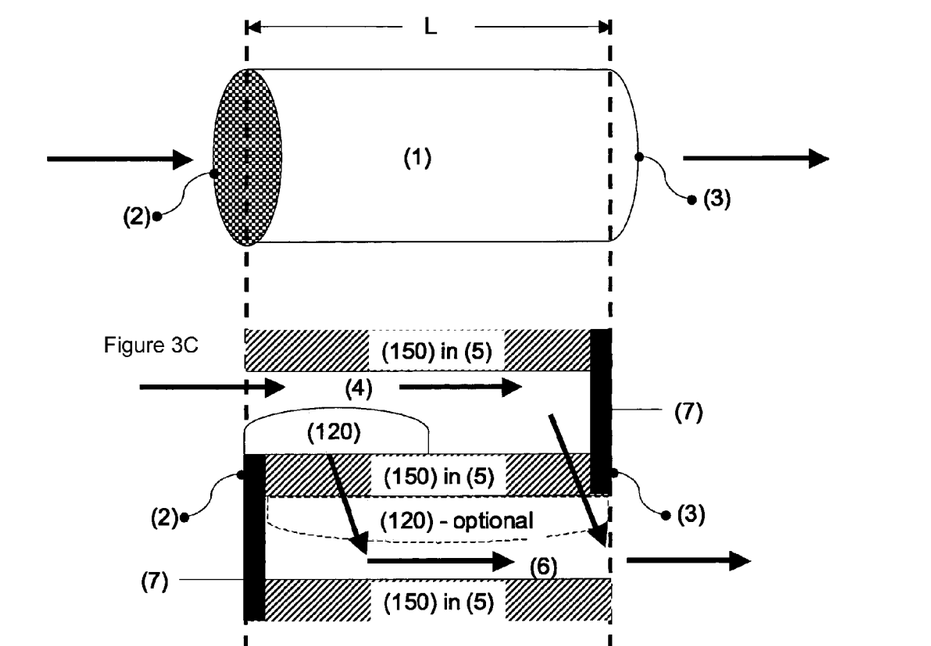

Moreover, in especially preferable embodiments of the device according to the invention, a further oxidation-catalytic coating 120 can be applied in the inflow channels 4 of the catalytically activated particulate filter. Such a coating 120 is preferably applied as a zone on the inflow side 2 over part of the length L of the wall-flow filter substrate 1, as is schematically shown in FIG. 3C. If the oxidation power of the coating 120 that has been applied in this manner is able to sufficiently oxidize the fractions of carbon monoxide and hydrocarbons present in the raw exhaust gas of the diesel engine and if it is also able to achieve adequate conversion rates for converting nitrogen monoxide into nitrogen dioxide, then the upstream diesel oxidation catalyst can optionally be completely dispensed with and the installation space needed for the overall system can be significantly diminished.

In this manner, a device is obtained for reducing carbon monoxide, hydrocarbons, nitrogen oxides and soot particles present in the exhaust gas of diesel engines, comprising an exhaust gas line and, as components thereof, the following in combination and in the flow direction of the exhaust gas in the order indicated below:

1. a first unit by means of which ammonia and/or a compound that breaks down to form ammonia can be metered into the exhaust gas that is to be purified;
2. a catalytically activated particulate filter, containing a wall-flow filter substrate comprising a catalytically active material that promotes the selective catalytic reduction of nitrogen oxides to form nitrogen, as well as at least one catalytically active coating that promotes the oxidation of carbon monoxide and hydrocarbons to form carbon dioxide, as well as the oxidation of nitrogen monoxide to form nitrogen dioxide;
3. a second unit by means of which ammonia and/or a compound that breaks down to form ammonia can be metered into the exhaust gas that is to be purified; as well as
4. a catalyst for the selective catalytic reduction of nitrogen oxides to form nitrogen.

As already explained above, the catalytically activated particulate filter that is used in the device according to embodiments of the invention or in the method according to embodiments of the invention entails conflicting goals between a high soot particle oxidation on the one hand, and the most effective reduction possible in the nitrogen oxide on the other hand, since the CRT reaction that is based on soot burn-off and the SCR reaction compete with each other for the reactant nitrogen dioxide. The embodiments described above are especially well-suited if the increase in the DeNOx efficiency of the overall system is the main objective, along with the savings in terms of installation space.

Figure 3D:
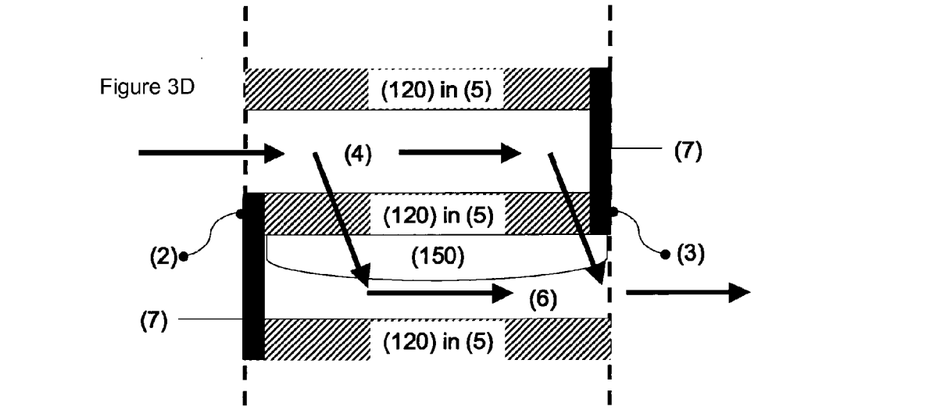

If, in addition to the installation space saved as a result of the volume savings attained by the downstream SCR catalyst, it is also an objective to improve the efficiency of the system involving the CRT reaction, then special preference is given to embodiments in which a catalytically active coating 150 that serves for the selective catalytic reduction in the catalytically activated particulate filter is applied to the porous wall 5 in the outflow channels 6. In this manner, the exhaust gas flowing into the particulate filter and containing nitrogen dioxide is first brought completely into contact with the soot particles that are to be oxidized and that have been deposited in the outflow channels 6. The contact with the SCR catalytically active coating 150 is only made afterwards—physically separately—in the outflow channels 6. Here, special preference is given to embodiments in which the catalytically activated particulate filter 1, as shown in FIG. 3D, additionally has an oxidation-catalytically active coating 120 and/or a coating that lowers the soot ignition temperature in the porous wall 5 between the inflow channels 4 and outflow channels 6.

In order to carry out a control of the DeNOx efficiency in a manner relating to the application, preferred embodiments of the device according to the invention also have sensors for determining the content of nitrogen oxide in the exhaust gas that is to be purified. Preferably, as shown in FIG. 2, a first of these sensors 60 is arranged upstream or downstream from the diesel oxidation catalyst as seen in the flow direction of the exhaust gas, whereas a second sensor 70 is arranged between the catalytically activated particulate filter and the second unit by means of which ammonia and/or a compound that breaks down to form ammonia can be metered into the exhaust gas that is to be purified. These two sensors 60, 70 make it possible to precisely calculate the amount of ammonia and/or of a compound that breaks down to form ammonia that has to be metered in for purposes of denitrification of the exhaust gas. In particularly preferred embodiments, a third sensor 80 that serves to determine the content of nitrogen oxide in the exhaust gas is situated behind the downstream SCR catalyst, as seen in the flow direction of the exhaust gas. Thanks to this third sensor, diagnostic modules can be provided for monitoring the DeNOx efficiency that is to be achieved within the overall system.

The sensors for determining the content of nitrogen oxide in the exhaust gas (that is to be purified) display cross sensitivity to ammonia, meaning that ammonia present in the exhaust gas leads to falsification of the values detected for the nitrogen oxide, and consequently, especially in cases where the catalytically activated particulate filter does not have an oxidation-catalytic coating on the outflow side, it is advantageous if an oxidation catalyst that promotes the oxidation of ammonia is arranged on the outflow side relative to the catalytically activated particulate filter and on the inflow side relative to the second sensor that serves to determine the content of nitrogen oxide in the exhaust gas that is to be purified. Since such a catalyst can be dimensioned to be very small and can be connected directly to the outlet side of the particulate filter in a catalyst housing, the loss of installation space that occurs due to the integration of such a catalyst is virtually negligible as compared to the catalyst volume savings with the downstream SCR catalyst in comparison to methods and devices according to the state of the art.

In order to effectively prevent the escape of ammonia into the environment, in preferred embodiments of the device according to the invention, another catalyst for the oxidation of ammonia is arranged on the outflow side relative to the catalyst for the selective catalytic reduction of nitrogen oxides. In order not to unnecessarily have a detrimental effect on the achievable installation space savings, this catalyst is especially preferably configured in the form of a coating zone arranged on the SCR catalyst on the outflow side (so-called integrated ammonia slip catalyst) and it has the highest possible selectivity to nitrogen.

The concrete configurations of the device according to embodiments of the invention and of the method according to embodiments of the invention entail a very high flexibility that makes it possible to find solutions that are optimized in terms of exhaust gas purification efficiency and installation space requirements for diesel engines of a wide array of power classes. Thus, through the selection of the various catalytically active coatings and through their arrangement in the catalytically activated particulate filter in conjunction with an adapted control of the metering in of the reducing agent by means of the two metering units that are present for the addition of ammonia and/or of a compound that breaks down to form ammonia, an optimal solution can be found for various purification tasks that arise from the setting of the combustion in the combustion chamber of the diesel engine for different power classes and from the use of different diesel fuels. The exhaust gas of diesel engines of different power classes, which might be operated with different grades of diesel fuel, differs in terms of the ratio of the noxious substances such as carbon monoxide, hydrocarbons, nitrogen oxides and particles that are present in the exhaust gas, and the exhaust gas also differs in terms of the exhaust gas temperature, the exhaust gas mass flow and the fraction of possible catalyst poisons such as, for example, sulfur oxides.

The catalytically active coating that is contained in the catalytically activated particulate filter and that promotes the selective catalytic reduction of nitrogen oxides to form nitrogen (SCR coating) preferably contains one or more active components selected from among the following:

transition metal oxides selected from among the group consisting of vanadium oxide, tungsten oxide, titanium oxide, cerium oxide, zirconium oxide, lanthanum oxide, praseodymium oxide, neodymium oxide, niobium oxide, molybdenum oxide, iron oxide and/or mixtures and mixed oxides thereof;

zeolites substituted with one or more transition metals and/or zeolite-like compounds, whereby the transition metals are selected from among the group consisting of iron, copper, platinum, iridium, silver, cerium and/or mixtures thereof; and whereby the zeolites and/or the zeolite-like compounds are selected from among the group consisting of ZSM-5, ZSM-20, USY, β-zeolite, FER, MOR, CHA, SAPO, ALPO and/or mixtures thereof.

The active components selected from these substance groups exhibit different ranges for the working temperature range and for the selectivity range as well as different levels of susceptibility to poisoning.

Thus, for example, SCR coatings containing vanadium oxide are characterized, among other things, in that hydrocarbons contained in the exhaust gas can already be oxidized on such coatings at medium exhaust gas temperatures without this detrimentally affecting the $NO_x$ conversion efficiency of the coating. In contrast, at operating temperatures above 450° C. [842° F.], SCR coatings containing vanadium oxide exhibit a loss of the selectivity to nitrogen since ammonia over-oxidation that forms nitrogen oxides occurs at these temperatures. In contrast, SCR coatings containing predominantly zeolites substituted with iron are characterized in that they have excellent rates at which they convert $NO_x$ into nitrogen, also in the temperature range above 450° C. [842° F.]; however, they are unfortunately very susceptible to poisoning by hydrocarbons. Before this backdrop, an SCR coating containing vanadium oxide in the catalytically activated particulate filter on the inflow side and an SCR catalyst containing zeolites substituted with iron on the outflow side can achieve excellent DeNOx efficiency, especially when the exhaust gas that is to be purified has relatively high concentrations of hydrocarbons that cannot be completely removed by the diesel oxidation catalyst on the inflow side, and/or if operating conditions prevail under which secondary emissions of hydrocarbons occur in the inflow channels of the catalytically activated particulate filter during the soot burn-off, and/or if, along with passive particulate filter regeneration (CRT effect), heating measures are taken for purposes of active particulate filter regeneration, during which significantly elevated hydrocarbon contents can occur upstream from the particulate filter in the exhaust gas that is to be purified.

Another example of an advantageous embodiment of the SCR coating in the catalytically activated particulate filter, on the one hand, and in the SCR catalyst that is arranged on the outflow side, on the other hand, is the combination of an SCR coating containing, on the one hand, copper-substituted zeolites and/or zeolite-like compounds in the catalytically activated particulate filter and, on the other hand, zeolites substituted with iron in the SCR catalyst that is arranged on the outflow side.

If the system is operated with a diesel fuel containing sulfur, the SCR coating containing copper and present in the catalytically activated particulate filter displays a higher susceptibility to poisoning by sulfur oxides, whereas the SCR catalyst coating containing iron can be classified as being sulfur-resistant. However, since the catalytically activated particulate filter is installed closer to the engine, it is exposed to markedly higher exhaust gas temperatures than the downstream SCR catalyst, so that a regular desulfurization of the coating containing copper is ensured during operation. Consequently, in this arrangement, the $SO_x$ susceptibility to poisoning on the part of the SCR coating in the catalytically activated particulate filter is not harmful as far as the DeNOx efficiency is concerned.

If such a system is operated with low-sulfur diesel fuel, then the catalytically activated particulate filter is advantageously provided with an SCR coating containing zeolites substituted with iron, whereas zeolites substituted with copper are suitable for the coating of the downstream SCR catalyst. This arrangement takes into account the fact that zeolites substituted with iron typically exhibit optimal levels of $NO_x$ conversion efficiency in the temperature range between 350° C. and 550° C. [662° F. and 1022° F.], whereas zeolites substituted with copper and/or zeolite-like compounds display optimal levels of $NO_x$ conversion efficiency in the temperature range between 250° C. and 400° C. [482° F. and 752° F.], but tend towards over-oxidation of ammonia at higher temperatures. The above-mentioned arrangement of the coatings takes into account the fact that the exhaust gas temperature drops in the flow direction.

Additional advantageous embodiments of the device according to the invention and of the method according to the invention could be listed but, with acceptable experimental effort, they are obvious to the person skilled in the art from the technical teaching of this invention, and they are encompassed by the scope of what is being claimed.

Additional optimal adaptations of the envisaged objective of attaining exhaust gas purification, along with the simultaneous optimization of the installation space needed for the device according to embodiments of the invention, ensue from a systematically adapted control of the quantities of ammonia and/or of a compound that breaks down to form ammonia that are metered in as the reducing agent by means of the two metering units present in the device according to embodiments of the invention.

Thus, embodiments of the method according to the invention that are characterized in that the first addition of ammonia and/or of a compound that breaks down to form ammonia to the exhaust gas that is to be purified is carried out in such a way that the amount of ammonia that is added or formed from the compound is greater than the amount of ammonia needed for the reduction of the nitrogen oxides contained in the exhaust gas that is to be purified to form nitrogen according to the corresponding reaction stoichiometry, if the $NO_x$ conversion efficiency of the catalytically activated particulate filter is to be raised to the maximum level possible, so that the smallest possible volume is achieved as far as the downstream SCR catalyst is concerned. Any nitrogen oxides that might result from the over-oxidation of ammonia in the catalytically activated particulate filter can be converted in the downstream SCR catalyst. Here, the amount of ammonia and/or of a compound that breaks down to form ammonia added via the second metering unit is preferably controlled in such a way that the amount of ammonia added or resulting from the breakdown of the compound corresponds to the amount of ammonia required according to the corresponding reaction stoichiometry. In order to further enhance the DeNOx efficiency of the overall system, such an embodiment of the method according to the invention particularly preferably makes use of a catalytically activated particulate filter that has an SCR coating in the porous wall between the inflow and outflow channels, and an oxidation-catalytically active coating on the wall in the outflow channels (see FIG. 3B) in order to once again provide a ratio of NO and $NO_2$ that is optimized in terms of the SCR reaction (1).

If a high CRT reaction rate is of the essence for the operation of the device according to embodiments of the invention, then preferred embodiments of the method according to the invention are especially those in which the first addition of ammonia and/or of a compound that breaks down to form ammonia to the exhaust gas that is to be purified is carried out in such a way that the amount of ammonia that is added or formed from the compound is smaller than the amount of ammonia needed for the reduction of the nitrogen oxides contained in the exhaust gas that is to be purified to form nitrogen according to the corresponding reaction stoichiometry. In this case, not enough reducing agent is available to achieve a complete $NO_x$ conversion during the SCR reaction that is taking place in the catalytically activated particulate filter and that is competing with the CRT reaction, so that larger amounts of $NO_2$ are available for the CRT reaction.

In the system according to embodiments of the invention described above, exclusively the use of ammonia and/or of a compound that breaks down to form ammonia is discussed as the reducing agent. It should be pointed out that fundamentally speaking, other reducing agents are also suited for the selective catalytic reduction of nitrogen by means of the SCR method. This applies in particular to hydrocarbons. In this case, the SCR reaction takes place according to the so-called "HC-$DeNO_x$" principle. The device according to embodiments of the invention and the method according to embodiments of the invention are analogously also suitable when such reducing agents are used instead of ammonia, whereby a few application-related adaptations are needed, which the person skilled in the art can derive from normal routine experiments for a particular application.

LIST OF REFERENCE NUMERALS

L the total length of the wall-flow filter substrate;
→ the flow direction of the exhaust gas;
(1) the wall-flow filter substrate;
(2) the inlet side of the wall-flow filter substrate;
(3) the outlet side of the wall-flow filter substrate;
(4) inflow channels;
(5) the porous wall that physically separates the inflow and outflow channels, from each other;
(6) outflow channels;
(7) gas-tight closure of the inflow and outflow channels;
(8) soot particles;
(10) an exhaust gas line;
(20) a diesel oxidation catalyst;
(30), (30') metering units for ammonia and/or for a compound that breaks down to form ammonia;
(40) a catalytically activated particulate filter, containing a wall-flow filter substrate with a catalytically active coating that promotes the selective catalytic reduction of nitrogen oxides to form nitrogen;
(50) an SCR catalyst;
(60) a first sensor;
(70) a second sensor;
(80) a third sensor;
(120) an oxidation-catalytically active coating;
(150) an SCR catalytically active coating.

What is claimed is:
1. A device for reducing carbon monoxide, hydrocarbons, nitrogen oxides and soot particles present in the exhaust gases of diesel engines, comprising an exhaust gas line and, as components thereof, the following in combination and in the flow direction of the exhaust gas in the order indicated below:
  a. a diesel oxidation catalyst for the oxidation of carbon monoxide, hydrocarbons and nitrogen monoxide;
  b. a first unit for the purification of diesel engine exhaust gases, the first unit for metering ammonia and/or a compound that breaks down to form ammonia into the diesel engine exhaust gases;
  c. a catalytically activated particulate filter, containing a wall-flow filter substrate comprising a catalytically active material that promotes the selective catalytic reduction of nitrogen oxides to form nitrogen;
  d. a second unit for metering ammonia and/or a compound that breaks down to form ammonia into the diesel engine exhaust gases; and
  e. a catalyst for the selective catalytic reduction of nitrogen oxides to form nitrogen; and further comprising a first sensor for determining the content of nitrogen oxide in the diesel engine exhaust gas arranged upstream or downstream from the diesel oxidation catalyst as seen in the flow direction of the exhaust gas; and a second sensor determining the content of nitrogen oxide in the diesel engine exhaust gas arranged between the catalytically activated particulate filter and the second unit by which ammonia and/or the compound that breaks down to form ammonia is meterable into the diesel engine exhaust gas.

2. The device as recited in claim 1 wherein the catalytically active material contained in the catalytically activated particulate filter is a catalytically active coating promoting the selective catalytic reduction of nitrogen oxides to form nitrogen.

3. The device as recited in claim 2 wherein in that the wall-flow filter substrate has inflow channels closed on the outlet side so as to be gas-tight and outflow channels closed on the inlet side so as to be gas-tight, the wall-flow filter substrate further including a porous wall physically separating the inflow and outflow channels from each other, the porous wall being permeable for the diesel engine exhaust gases, the porous wall including the catalytically active coating for the selective catalytic reduction of nitrogen oxides to form nitrogen.

4. The device as recited in claim 2 wherein the wall-flow filter substrate has inflow channels closed on the outlet side so as to be gas-tight and outflow channels closed on the inlet side so as to be gas-tight, the wall-flow filter substrate further including a porous wall physically separating the inflow and outflow channels from each other, the porous wall being permeable for the diesel engine exhaust gas, the catalytically active coating for the selective catalytic reduction of nitrogen oxides to form nitrogen being applied to the porous wall in the outflow channels.

5. The device as recited in claim 1 further comprising a third sensor determining the content of nitrogen oxide in the diesel engine exhaust gas is situated downstream from the SCR catalyst, as seen in the flow direction of the diesel engine exhaust gas.

6. The device as recited in claim 1 further comprising an oxidation catalyst for promoting the oxidation of ammonia arranged on the outflow side relative to the catalytically activated particulate filter and on the inflow side relative to the second sensor, the oxidation catalyst serving to determine the content of nitrogen oxide in the diesel engine exhaust gas.

7. The device as recited in claim 1 further comprising a catalyst for the oxidation of ammonia is arranged on the outflow side relative to the catalyst for the selective catalytic reduction of nitrogen oxides.

8. A device for reducing carbon monoxide, hydrocarbons, nitrogen oxides and soot particles present in the exhaust gases of diesel engines, comprising an exhaust gas line and, as components thereof, the following in combination and in the flow direction of the exhaust gas in the order indicated below:
  a. a diesel oxidation catalyst for the oxidation of carbon monoxide, hydrocarbons and nitrogen monoxide;
  b. a first unit for the purification of diesel engine exhaust gases, the first unit for metering ammonia and/or a compound that breaks down to form ammonia into the diesel engine exhaust gases;
  c. a catalytically activated particulate filter, containing a wall-flow filter substrate comprising a catalytically active material that promotes the selective catalytic reduction of nitrogen oxides to form nitrogen;
  d. a second unit for metering ammonia and/or a compound that breaks down to form ammonia into the diesel engine exhaust gases; and
  e. a catalyst for the selective catalytic reduction of nitrogen oxides to form nitrogen, wherein the catalytically activated particulate filter includes at least one catalytically active coating promoting the oxidation of carbon monoxide and hydrocarbons to form carbon dioxide and promoting the oxidation of nitrogen monoxide to form nitrogen dioxide.

9. A device for reducing carbon monoxide, hydrocarbons, nitrogen oxides and soot particles present in the exhaust gas of diesel engines, comprising an exhaust gas line and, as components thereof, the following in combination and in the flow direction of the exhaust gas in the order indicated below:
  a. a first unit for metering ammonia and/or a compound that breaks down to form ammonia into the diesel engine exhaust gas to be purified;
  b. a catalytically activated particulate filter, containing a wall-flow filter substrate including a catalytically active material promoting the selective catalytic reduction of nitrogen oxides to form nitrogen, the wall-flow filter substrate also including at least one catalytically active coating promoting the oxidation of carbon monoxide and hydrocarbons to form carbon dioxide and promoting the oxidation of nitrogen monoxide to form nitrogen dioxide;
  c. a second unit for metering ammonia and/or a compound that breaks down to form ammonia into the diesel engine exhaust gas; and
  d. a catalyst for the selective catalytic reduction of nitrogen oxides to form nitrogen.

10. A method for reducing carbon monoxide, hydrocarbons, nitrogen oxides and soot particles present in the exhaust gases of diesel engines, comprising the following:
  a. passing the diesel engine exhaust gas that is to be purified through a diesel oxidation catalyst such that carbon monoxide and hydrocarbons are oxidized at least proportionally to form carbon dioxide, and nitrogen monoxide is oxidized at least proportionally to form nitrogen dioxide;
  b. adding a first addition of ammonia and/or of a compound that breaks down to form ammonia to the diesel engine exhaust gas on the outflow side relative to the diesel oxidation catalyst c. passing, after the first addition of ammonia and/or of a compound that breaks down to form ammonia, the diesel engine exhaust gas through a catalytically activated particulate filter, containing a wall-flow filter substrate including a catalytically active material promoting the selective catalytic reduction of nitrogen oxides to form nitrogen, such that the soot particles are deposited in the particulate filter and oxidized at least proportionally with the nitrogen dioxide contained in the exhaust gas so as to form carbon monoxide and/or carbon dioxide, and such that the nitrogen oxides that are contained in the diesel engine exhaust gas and/or that are formed as by-products during the soot oxidation are reduced at least proportionally with ammonia to form nitrogen;

d. adding a second addition of ammonia and/or of a compound that breaks down to form ammonia to the diesel engine exhaust, on the outflow side relative to the particulate filter; as well as e. passing, after the second addition of ammonia and/or of a compound that breaks down to form ammonia, the diesel engine exhaust gas through a catalyst for the selective catalytic reduction of nitrogen oxides such that nitrogen monoxide and nitrogen dioxide are reduced at least proportionally with ammonia to form nitrogen, wherein the first addition of ammonia and/or of a compound that breaks down to form ammonia to the diesel engine exhaust gas is carried out in such a way that the amount of ammonia added or formed from the compound is greater than the amount of ammonia needed for the reduction of the nitrogen oxides contained in the diesel engine exhaust gas to form nitrogen according to the corresponding reaction stoichiometry.

11. A method for reducing carbon monoxide, hydrocarbons, nitrogen oxides and soot particles present in the exhaust gases of diesel engines, comprising the following:

a. passing the diesel engine exhaust gas that is to be purified through a diesel oxidation catalyst such that carbon monoxide and hydrocarbons are oxidized at least proportionally to form carbon dioxide, and nitrogen monoxide is oxidized at least proportionally to form nitrogen dioxide;

b. adding a first addition of ammonia and/or of a compound that breaks down to form ammonia to the diesel engine exhaust gas on the outflow side relative to the diesel oxidation catalyst c. passing, after the first addition of ammonia and/or of a compound that breaks down to form ammonia, the diesel engine exhaust gas through a catalytically activated particulate filter, containing a wall-flow filter substrate including a catalytically active material promoting the selective catalytic reduction of nitrogen oxides to form nitrogen, such that the soot particles are deposited in the particulate filter and oxidized at least proportionally with the nitrogen dioxide contained in the exhaust gas so as to form carbon monoxide and/or carbon dioxide, and such that the nitrogen oxides that are contained in the diesel engine exhaust gas and/or that are formed as by-products during the soot oxidation are reduced at least proportionally with ammonia to form nitrogen;

d. adding a second addition of ammonia and/or of a compound that breaks down to form ammonia to the diesel engine exhaust, on the outflow side relative to the particulate filter; as well as e. passing, after the second addition of ammonia and/or of a compound that breaks down to form ammonia, the diesel engine exhaust gas through a catalyst for the selective catalytic reduction of nitrogen oxides such that nitrogen monoxide and nitrogen dioxide are reduced at least proportionally with ammonia to form nitrogen, wherein the first addition of ammonia and/or of a compound that breaks down to form ammonia to the diesel engine exhaust gas is carried out in such a way that the amount of ammonia added or formed from the compound is smaller than the amount of ammonia needed for the reduction of the nitrogen oxides contained in the diesel engine exhaust gas to form nitrogen according to the corresponding reaction stoichiometry.

12. A device for reducing carbon monoxide, hydrocarbons, nitrogen oxides and soot particles present in the exhaust gases of diesel engines, comprising an exhaust gas line and, as components thereof, the following in combination and in the flow direction of the exhaust gas in the order indicated below:

a. a diesel oxidation catalyst for the oxidation of carbon monoxide, hydrocarbons and nitrogen monoxide;

b. a first unit for the purification of diesel engine exhaust gases, the first unit for metering ammonia and/or a compound that breaks down to form ammonia into the diesel engine exhaust gases;

c. a catalytically activated particulate filter, containing a wall-flow filter substrate comprising a catalytically active material that promotes the selective catalytic reduction of nitrogen oxides to form nitrogen;

d. a second unit for metering ammonia and/or a compound that breaks down to form ammonia into the diesel engine exhaust gases; and e. a catalyst for the selective catalytic reduction of nitrogen oxides to form nitrogen, wherein the wall-flow filter substrate itself is made of the catalytically active material that promotes the selective catalytic reduction of nitrogen oxides to form nitrogen.

13. A device for reducing carbon monoxide, hydrocarbons, nitrogen oxides and soot particles present in the exhaust gases of diesel engines, comprising an exhaust gas line and, as components thereof, the following in combination and in the flow direction of the exhaust gas in the order indicated below:

a. a diesel oxidation catalyst for the oxidation of carbon monoxide, hydrocarbons and nitrogen monoxide;

b. a first unit for the purification of diesel engine exhaust gases, the first unit for metering ammonia and/or a compound that breaks down to form ammonia into the diesel engine exhaust gases;

c. a catalytically activated particulate filter, containing a wall-flow filter substrate comprising a catalytically active material that promotes the selective catalytic reduction of nitrogen oxides to form nitrogen;

d. a second unit for metering ammonia and/or a compound that breaks down to form ammonia into the diesel engine exhaust gases; and e. a catalyst for the selective catalytic reduction of nitrogen oxides to form nitrogen, wherein the catalytically active material contained in the catalytically activated particulate filter is a catalytically active coating promoting the selective catalytic reduction of nitrogen oxides to form nitrogen, wherein the wall-flow filter substrate has inflow channels closed on the outlet side so as to be gas-tight and outflow channels closed on the inlet side so as to be gas-tight, the wall-flow filter substrate further including a porous wall physically separating the inflow and outflow channels from each other, the porous wall being permeable for the diesel engine exhaust gas, the catalytically active coating for the selective catalytic reduction of nitrogen oxides to form nitrogen being applied to the porous wall in the outflow channels, wherein the wall-flow filter substrate further includes a second catalytically active coating in the inflow channels, the second catalytically active coating being different from the catalytically active coating in the outflow channels.

14. The device as recited in claim 13 wherein the catalytically active coating in the outflow channels includes vanadium oxide contains zeolites substituted with iron and the second catalytically active coating in the inflow channels includes vanadium oxide.

15. A device for reducing carbon monoxide, hydrocarbons, nitrogen oxides and soot particles present in the exhaust gases of diesel engines, comprising an exhaust gas line and, as components thereof, the following in combination and in the flow direction of the exhaust gas in the order indicated below:
   a. a diesel oxidation catalyst for the oxidation of carbon monoxide, hydrocarbons and nitrogen monoxide;
   b. a first unit for the purification of diesel engine exhaust gases, the first unit for metering ammonia and/or a compound that breaks down to form ammonia into the diesel engine exhaust gases;
   c. a catalytically activated particulate filter, containing a wall-flow filter substrate comprising a catalytically active material that promotes the selective catalytic reduction of nitrogen oxides to form nitrogen;
   d. a second unit for metering ammonia and/or a compound that breaks down to form ammonia into the diesel engine exhaust gases; and
   e. a catalyst for the selective catalytic reduction of nitrogen oxides to form nitrogen,
   wherein the catalytically active material contained in the catalytically activated particulate filter is a catalytically active coating promoting the selective catalytic reduction of nitrogen oxides to form nitrogen,
   wherein in that the wall-flow filter substrate has inflow channels closed on the outlet side so as to be gas-tight and outflow channels closed on the inlet side so as to be gas-tight, the wall-flow filter substrate further including a porous wall physically separating the inflow and outflow channels from each other, the porous wall being permeable for the diesel engine exhaust gases, the porous wall including the catalytically active coating for the selective catalytic reduction of nitrogen oxides to form nitrogen, wherein the wall-flow filter substrate further includes a second catalytically active coating in the outflow channels, the second catalytically active coating being different from the catalytically active coating included in the porous wall.

16. The device as recited in claim 15 wherein the catalytically active coating included in the porous wall includes copper-substituted zeolites and/or zeolite-like compounds and the second catalytically active coating in the outflow channels includes zeolites substituted with iron.

* * * * *